United States Patent
Dost et al.

(10) Patent No.: US 9,321,493 B2
(45) Date of Patent: Apr. 26, 2016

(54) UTILITY VEHICLE CANOPY

(71) Applicant: Hol Special Parts Pty Ltd, Moorabbin (AU)

(72) Inventors: Mohammad Omer Dost, Moorabbin (AU); Mohammad Masood Aimaq, Rowville (AU)

(*) Notice: Subject to any disclaimer, the term of this patent is extended or adjusted under 35 U.S.C. 154(b) by 0 days.

(21) Appl. No.: 14/184,790

(22) Filed: Feb. 20, 2014

(65) Prior Publication Data

US 2014/0367990 A1 Dec. 18, 2014

(30) Foreign Application Priority Data

Jun. 13, 2013 (AU) .............................. 2013206393
Nov. 18, 2013 (AU) .............................. 2013257537

(51) Int. Cl.
| | | |
|---|---|---|
| B62D 25/04 | (2006.01) | |
| B62D 27/02 | (2006.01) | |
| B62D 33/04 | (2006.01) | |
| B60R 9/06 | (2006.01) | |

(52) U.S. Cl.
CPC .............. B62D 33/044 (2013.01); B60R 9/065 (2013.01); Y10T 29/49826 (2015.01)

(58) Field of Classification Search
CPC ........ B62D 25/04; B62D 25/08; B62D 27/02; B62D 27/27; B62D 27/026; B62D 29/008
USPC .............. 296/102, 105, 10, 100.02, 156, 163, 296/164, 173, 176, 181.7, 3, 203.01, 296/203.02, 203.03, 193.06; 135/88.01, 135/116
See application file for complete search history.

(56) References Cited

U.S. PATENT DOCUMENTS

| | | | |
|---|---|---|---|
| 2,489,670 A | | 11/1949 | Powell, Jr. |
| 3,149,878 A | * | 9/1964 | Heermann .................... 296/102 |
| 4,332,265 A | * | 6/1982 | Baker ............................ 296/159 |
| 4,697,240 A | | 9/1987 | Cedar et al. |
| 4,738,274 A | * | 4/1988 | Heath ........................... 135/137 |
| 5,018,778 A | * | 5/1991 | Goble ............................ 296/159 |
| 5,531,497 A | | 7/1996 | Cheng et al. |
| 5,752,736 A | * | 5/1998 | Nodier .................... B60J 7/102 |
| | | | 135/88.15 |
| D400,028 S | * | 10/1998 | Farrer ........................... D6/431 |
| 5,997,075 A | * | 12/1999 | Dunder et al. ................ 296/178 |
| 6,655,725 B2 | * | 12/2003 | Soldatelli ................. 296/100.01 |
| 6,945,589 B2 | * | 9/2005 | Quesenberry ............ 296/100.02 |
| 2002/0133319 A1 | | 9/2002 | Tang |
| 2002/0167190 A1 | | 11/2002 | McElwee |
| 2003/0094832 A1 | | 5/2003 | Soldatelli |
| 2005/0023314 A1 | | 2/2005 | Williams |
| 2006/0033360 A1 | | 2/2006 | Taylor |
| 2007/0038422 A1 | | 2/2007 | Wang et al. |
| 2010/0201154 A1 | | 8/2010 | Kramer |

FOREIGN PATENT DOCUMENTS

DE          19711738        *  9/1998

* cited by examiner

*Primary Examiner* — Dennis H Pedder
(74) *Attorney, Agent, or Firm* — Michael G. Johnston; Moore & Van Allen PLLC

(57) ABSTRACT

A utility vehicle canopy comprises a frame having a plurality of hollow elongate frame members coupled together with a plurality of corner members received within the frame members. A plurality of panels, one or more of which may be hinged, are affixed to the frame and include side panels, a roof panel and a floor for mounting the canopy to a chassis of the vehicle. The canopy can be provided as a kit for flat-pack transportation and self-assembly.

19 Claims, 18 Drawing Sheets

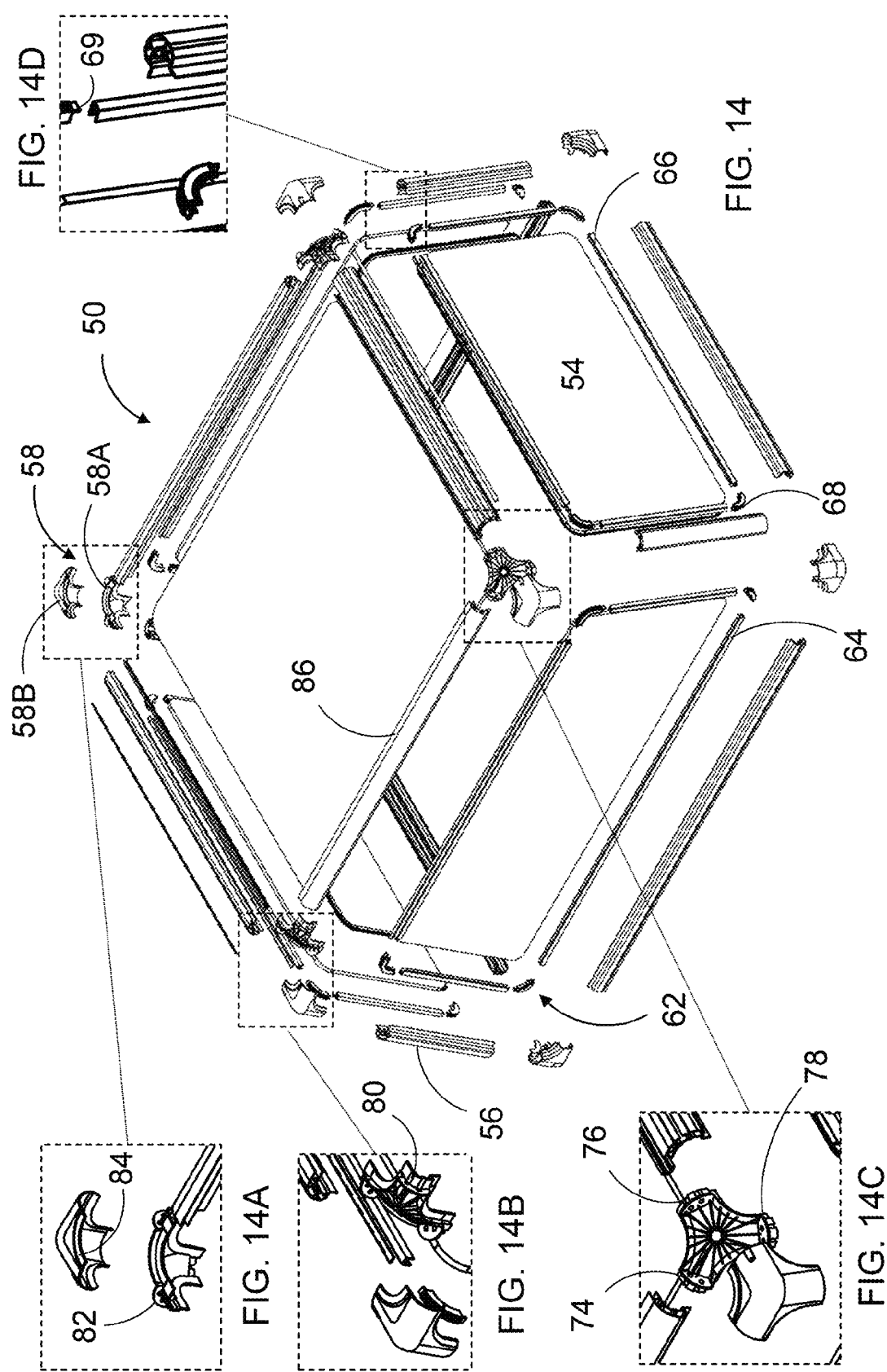

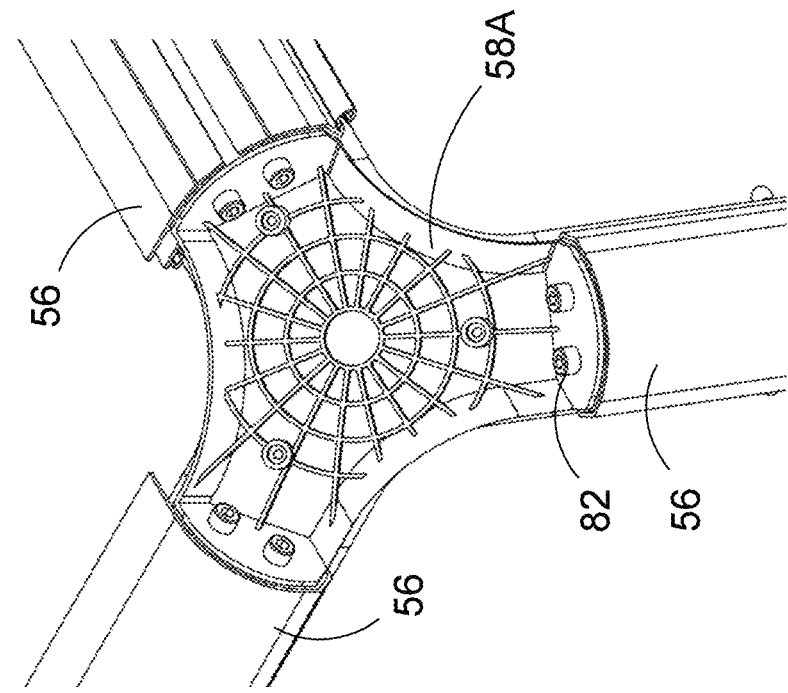
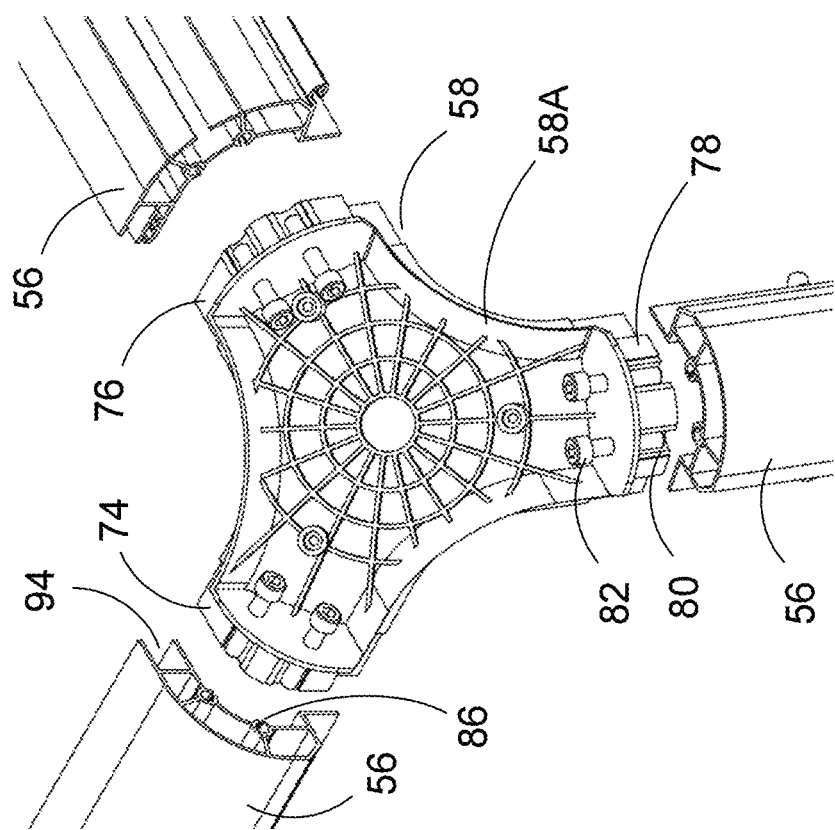
FIG. 15A
FIG. 15B

UTILITY VEHICLE CANOPY

FIELD OF THE INVENTION

The present invention relates to utility vehicle canopies. In particular, although not exclusively, the invention relates to the construction of utility vehicle canopies.

BACKGROUND TO THE INVENTION

Utility vehicles, or "utes", also known as pick up trucks, pick ups or simply trucks, typically comprise a cabin for the driver and one or more passengers and a tray mounted to the chassis behind the cabin for carrying and storing loads. The trays are provided in a wide variety of designs including flat trays, trays with side and end walls, which may be hinged and trays comprising storage compartments on top of and/or underneath the trays. Often the trays are enclosed with a canopy, which protects the contents of the tray from the elements, provides additional storage volume and improved security. Canopies can be factory fitted or retro-fitted to the tray and are available in a range of styles and designs. The term utility vehicle will be used hereinafter, but it will be appreciated that such references also include pick up trucks, pick ups, trucks or any other vehicle to which a canopy can be affixed.

The canopies that can be retro-fitted to the trays of utility vehicles are typically designed for the particular marque (make) and model of utility vehicle and therefore are only available in standard sizes. Canopies are typically made from sheets of steel welded together to form the finished canopy. Alternatively, the canopy is thermoformed from suitable plastics material, such as ABS. Therefore, another problem is that the finished canopies need to be transported from the manufacturing point to the retailer or the customer, which incurs significant transport costs due to the size, shape and mass of the canopies.

OBJECT OF THE INVENTION

It is a preferred object of the present invention to provide a utility vehicle canopy that addresses or at least ameliorates one or more of the aforementioned problems of the prior art and/or provides a useful commercial alternative.

SUMMARY OF THE INVENTION

Generally, embodiments of the present invention relate to utility vehicle canopies having improved portability compared with the prior art. In particular, embodiments of the present invention relate to flat-pack canopies for utility vehicles and methods of construction of such canopies.

According to one aspect, but not necessarily the broadest aspect, the invention resides in a utility vehicle canopy comprising:
 a frame comprising a plurality of elongate frame members coupled together with a plurality of corner members; and
 a plurality of panels affixed to the frame.

Preferably, the utility vehicle canopy is provided as a kit for self-assembly.

Suitably, the elongate frame members are hollow tubes.

Suitably, the elongate frame members have a square cross section.

Suitably, the elongate frame members have an arcuate cross section.

Suitably, one or more of the elongate members comprise flanges along their lateral edges.

Suitably, the elongate frame members are manufactured via an extrusion process.

Preferably, the corner members comprise a first arm, a second arm and a third arm which are received within the elongate frame members.

Suitably, the corner members comprise an inner corner member over which an outer corner member is fitted.

Suitably, the outer corner member is secured in place such that an outer surface of the outer corner member is flush with an outer surface of the adjacent elongate frame members.

Suitably, the corner members are manufactured via a moulding process.

Suitably, the first and second arms of the corner members are perpendicular or substantially perpendicular.

Suitably, the third arm is perpendicular or substantially perpendicular to the first and second arms. Alternatively, the third arm is inclined with respect to the first and second arms.

Preferably, an inner profile of the elongate frame members is complimentary to an outer profile of one or more of the first arm, the second arm and the third arm.

Suitably, the elongate frame members are secured to the corner members with one or more fasteners.

Preferably, a slot is provided in an inside edge of one or more of the elongate frame members in an upper level to receive a roof panel.

Suitably, at least one of the panels is affixed to the elongate frame members with a hinge.

Suitably, one or more parts of the hinge are formed integrally with the adjacent elongate frame member and/or the adjacent panel frame member.

Suitably, the utility vehicle canopy comprises four wall panels and a roof panel.

Suitably, the panels are rigid or can be formed from a flexible material.

Suitably, the utility vehicle canopy further comprises a floor, which can be bolted to a tray of the utility vehicle.

Suitably, the floor comprises one or more mounts to mount the floor to a chassis of the utility vehicle.

Suitably, the utility vehicle canopy comprises one or more racks mounted to the roof panel.

Suitably, the canopy further comprises a roll over protection system coupled to the canopy and/or a part of the utility vehicle.

The canopy may further comprise one or more legs for coupling the canopy to the floor or to a chassis of the utility vehicle.

According to another aspect, but not necessarily the broadest aspect, the invention resides in a method of making a utility vehicle canopy, the method comprising:
 constructing a frame by coupling a plurality of corner members to a plurality of elongate frame members; and
 affixing a plurality of panels to the frame.

Preferably, the method includes inserting arms of the corner members into hollow tubes of the elongate frame members.

According to another aspect, but not necessarily the broadest aspect, the invention resides in a method of providing a utility vehicle canopy, the method comprising:
 receiving, via a computing device over a communications network, measurements of a utility vehicle to which the canopy is to be fitted and/or measurements of the canopy required;
 cutting a plurality of elongate frame members and a plurality of panels to size based on the measurements; and providing the plurality of elongate frame members, the plurality of panels and a plurality of corner members as a kit for self-assembly of the canopy.

Further aspects and/or features of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein:

FIG. 14 is an exploded perspective view of the utility vehicle canopy shown in FIG. 13;

FIG. 14A is zoomed view of a region of FIG. 14 showing details of an underside of an inner corner member and an outer corner member;

FIG. 14B is zoomed view of a region of FIG. 14 showing details of protrusions or recesses in an arm of the inner corner member;

FIG. 14C is zoomed view of a region of FIG. 14 showing details of upper side of an inner corner member and an outer corner member;

FIG. 14D is zoomed view of a region of FIG. 14 showing details of panel corner members and an elongate frame member;

FIG. 15A is a perspective view showing details of three elongate frame members and an inner corner member;

FIG. 15B is a perspective view showing the three elongate frame members and the inner corner member shown in FIG. 15A coupled together;

Figure 1:
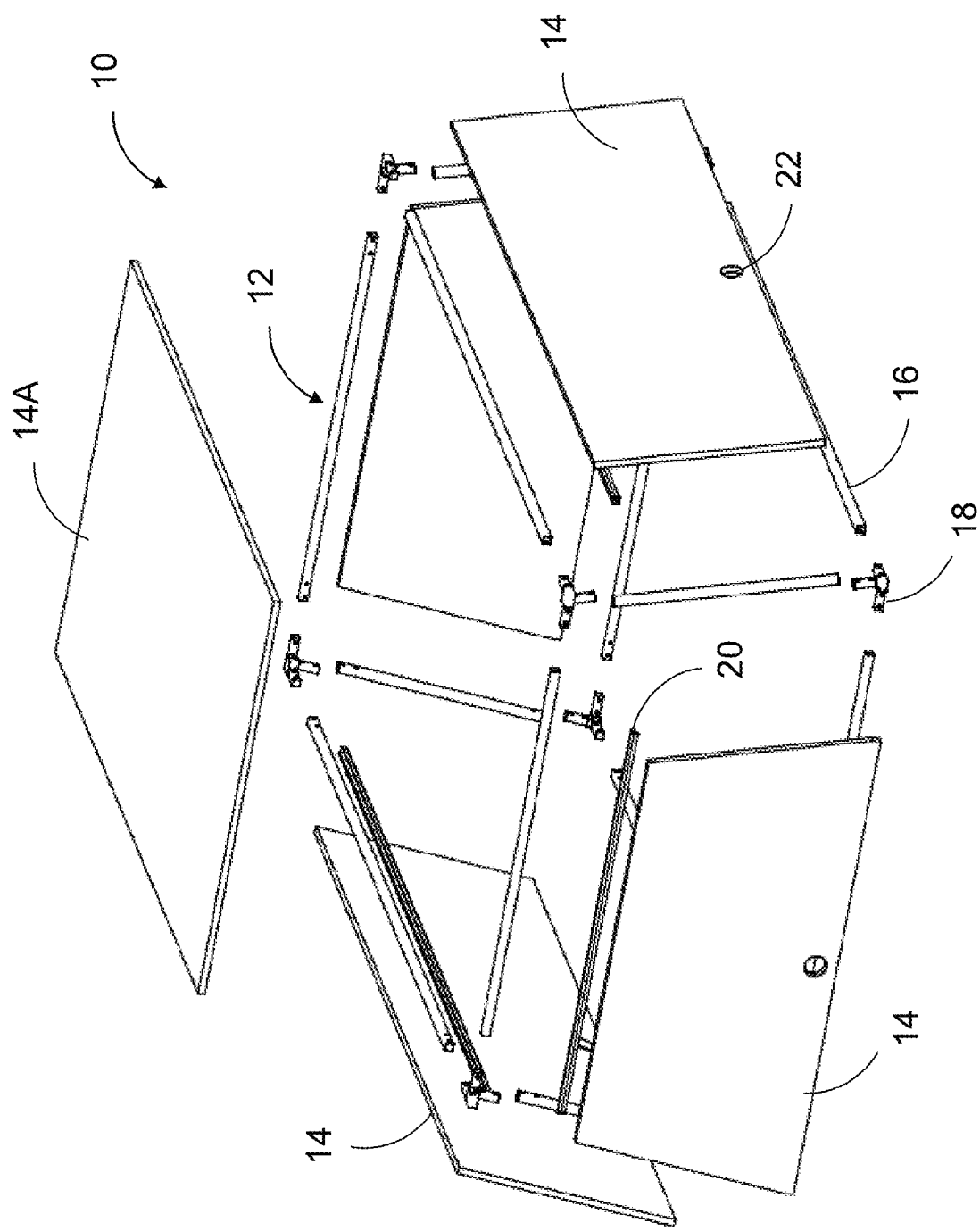
FIG. 1 is an exploded view of a utility vehicle canopy in accordance with one embodiment of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Figure 2:
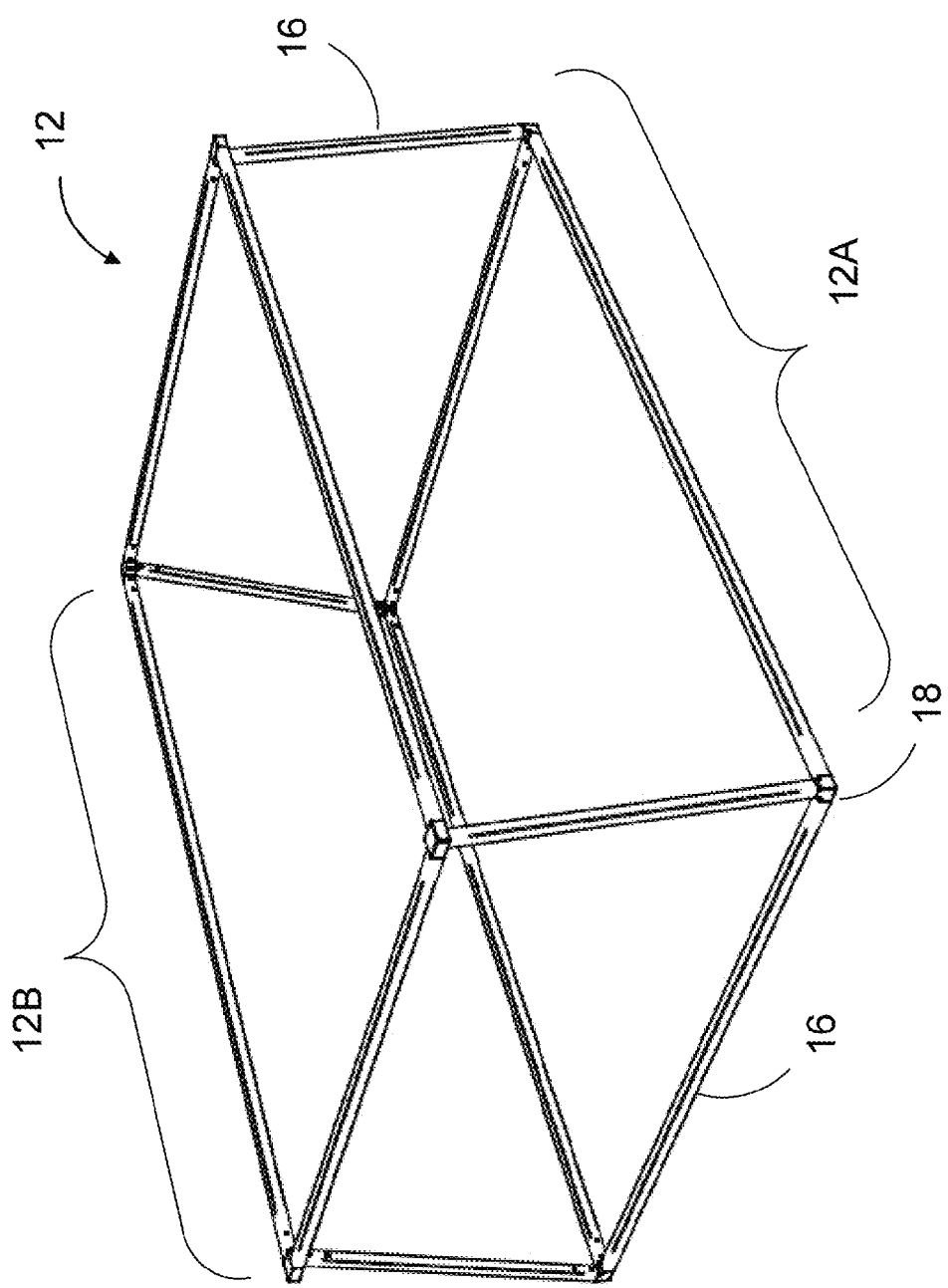
FIG. 2 is a perspective view of an assembled frame of the canopy shown in FIG. 1.

Referring to FIGS. 1 and 2 and in accordance with some embodiments of the present invention, a utility vehicle canopy 10 comprises a frame 12 and a plurality of panels 14 affixed to the frame. The frame 12 comprises a plurality of elongate frame members 16 coupled together with a plurality of corner members 18. In the embodiment shown in FIGS. 1 and 2, the frame 12 comprises a lower level 12A comprising four elongate frame members 16 coupled together with four corner members 18. The frame 12 also comprises an upper level 12B comprising four elongate frame members 16 coupled together with four corner members 18. The area covered by the lower level 12A of the frame 12 can match the area of a tray (not shown) of the utility vehicle and is larger than the area covered by the upper level 12B of the frame 12. Four elongate frame members 16 couple the corner members 18 of the upper and lower levels of the frame 12 in a spaced apart relationship, thus defining the shape and volume of the canopy 10. In this embodiment, the sides of the frame 12 and therefore the canopy 10 are inclined from the lower level 12A to the upper level 12B.

The canopy 10 comprises four wall panels 14 including two side panels and two end panels, and a roof panel 14A. In this embodiment, the side panels and the roof panel are quadrilaterals whereas the end panels are in the shape of a trapezium due to the inclined sides of the frame 12 and the canopy 10. The panels 14, 14A can be made from any suitable strong, preferably lightweight material. In preferred embodiments, the panels are made from a thermoplastic honeycomb core sandwiched between sheets of fibre reinforced plastic, which is very strong and very light and is available under the brand name Monopan.

One or more of the panels 14, 14A can be affixed to the elongate frame members 16 with a hinge 20 or other pivoting device along one side of the panel. In FIG. 1, the utility vehicle canopy 10 is shown with both side panels 14 and one of the end panels 14 affixed to the elongate frame members 16 with a hinge, which allows access to the interior of the canopy 10 from both sides and the rear of the utility vehicle. In this embodiment, the other end panel is not hinged because it would be adjacent the rear of the cabin of the utility vehicle. In some embodiments, the roof panel 14A can be hinged to one of the elongate frame members 16, for example, to provide ventilation to the interior of the canopy and/or to allow longer items to protrude from the roof. In some embodiments, hinge 20 is in the form of a PVC strip, which has a low profile, is lightweight, weatherproof, corrosion resistant, UV stabilised and maintenance free. Such hinges are available under the brand name Centreflex. Apertures 22 in panels 14 allow locking mechanisms to be fitted to secure the panels in a closed position.

The utility vehicle canopy 10 is provided as a kit for self-assembly and can be provided as a flat-pack for transportation. In some embodiments, the flat-pack is only about 19-20 cm thick.

Figure 3:
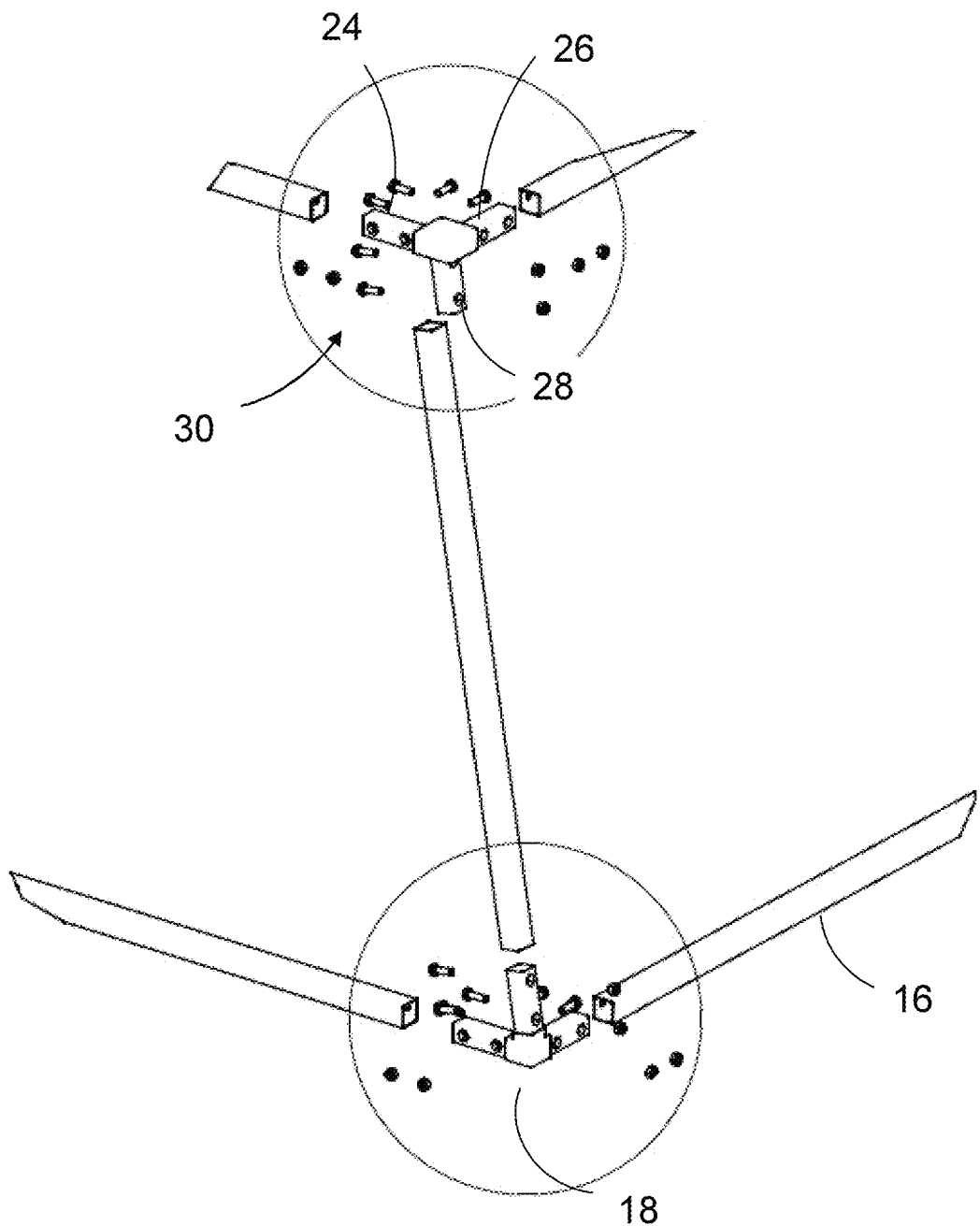
FIG. 3 is an exploded view of corner members and elongate frame members of the frame shown in FIG. 2.

With reference to FIG. 3, in some embodiments the elongate frame members 16 are in the form of hollow tubes. In the embodiments shown in the drawings, the elongate frame members 16 have a square cross section. However, in other embodiments, the elongate frame members 16 can have other cross sectional shapes, such as circular, triangular or other polygonal shapes.

In these embodiments, the corner members 18 comprise a first arm 24, a second arm 26 and a third arm 28 which are received within the hollow tubes of the elongate frame members 16. The elongate frame members 16 can be secured to the corner members 18 with one or more fasteners 30, such as nuts and bolts passing through apertures in the elongate frame members 16 and in the corner members 18, as shown in FIG. 3. The use of nuts and bolts assists with the self-assembly of the canopy by the end user. However, other types of fasteners can be employed, such as screws, rivets, welding or glue depending on the materials used for the frame 12 and the corner members 18.

Figure 4:
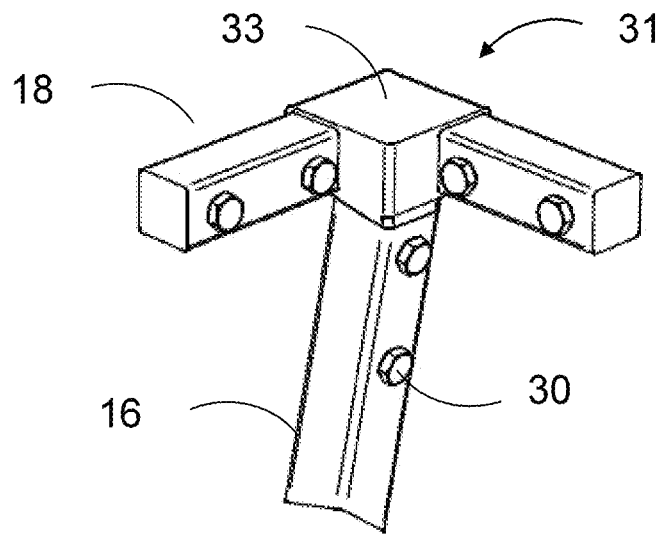
FIG. 4 is a perspective view of an upper corner of the frame shown in FIG. 2.
Figure 5:
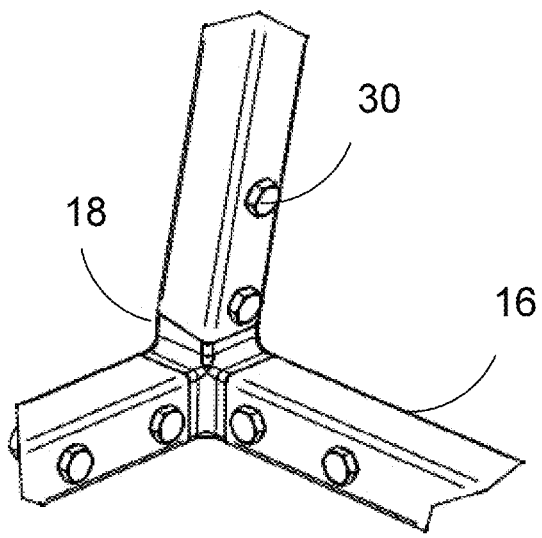
FIG. 5 is a perspective view of a lower corner of the frame shown in FIG. 2.

FIG. 4 shows an upper corner of the frame 12 and FIG. 5 shows a lower corner of the frame 12 in an assembled state with fasteners 30 in the form of nuts and bolts securing the elongate frame members 16 to the corner members 18. A junction 31 of the corner member 18 comprises a flat surface 33. For the corner members 18 used for the upper corner of the frame 12, the flat surface 33 allows the roof panel 14A to fit flush with the frame 12. For the corner members 18 used for the lower corner of the frame 12, the flat surface 33 allows the frame 12 to fit flush with a tray of the vehicle or with a floor 34 shown in FIGS. 8 and 9.

The corner members 18 will now be described in more detail with reference to FIGS. 6 and 7. In some embodiments, the first and second arms 24, 26 of the corner members 18 are perpendicular or substantially perpendicular. The perpendicular or substantially perpendicular first and second arms 24, 26 thus create the square corners of the lower level 12A and the upper level 12B of the frame 12.

Figure 6:
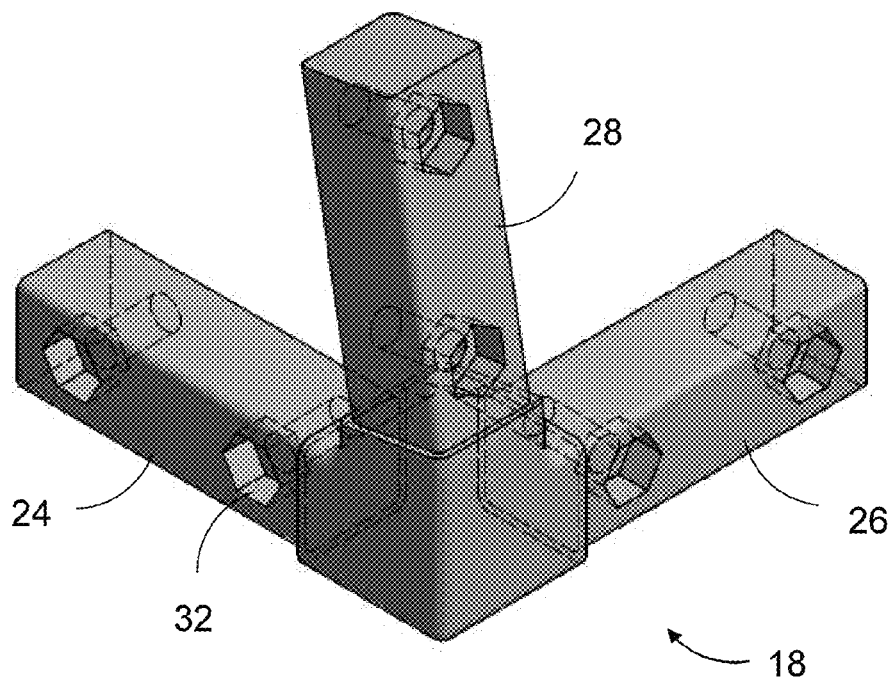
FIG. 6 is an enlarged perspective view of a corner member for a lower corner of the frame shown in FIG. 1.

As shown in FIG. 6, in some embodiments the third arm 28 of the corner members 18 is inclined with respect to the first and second arms 24, 26, which result in the frame 12 having angled sides and the side panels 14 of the canopy 10 being inclined. In some embodiments the third arm 28 is angled at about 10 degrees to the vertical. However, it will be appreciated that other angles can be used to determine the extent to which the sides of the frame 12 and therefore the side panels 14 of the canopy 10 are inclined as desired.

Figure 7:
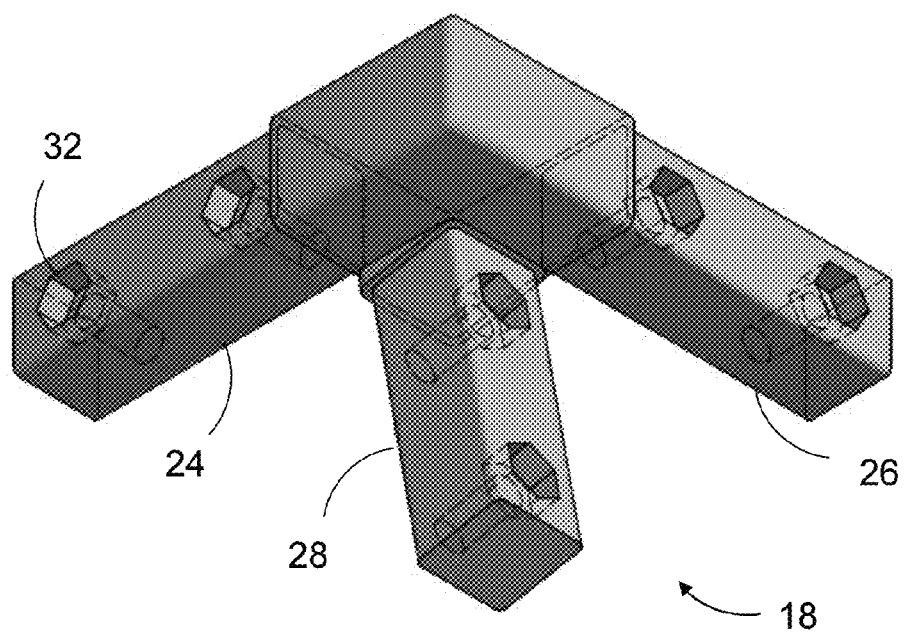
FIG. 7 is an enlarged perspective view of a corner member for an upper corner of the frame shown in FIG. 1.

The corner member 18 shown in FIG. 6 is used for the corners of the lower level 12A of the frame and the corner member 18 shown in FIG. 7 is used for the upper level 12B of the frame 12. Hence, the third arm 28 of the corner member 18 in FIG. 6 is upwardly depending and the third arm 28 of the corner member 18 in FIG. 7 is downwardly depending for coupling to the elongate frame members 16 which connect the upper level 12A and the lower level 12B of the frame 12.

In some embodiments, the corner members 18 are cast in a single piece from a suitable metal. Alternatively, the corner members 18 are made by welding the first, second and third arms 24, 26, 28 to the junction 31. In other embodiments, arms 24, 26, 28 can be bolted, screwed or otherwise fastened to the junction 31. However, it is envisaged that in other embodiments the corner members 18 can be moulded from a suitably strong plastics material.

As shown in FIGS. 6 and 7, the corner members 18 comprise one or more apertures 32 through which fasteners pass to secure the elongate frame members 16. In the embodiments shown in FIGS. 6 and 7, first, second and third arms 24, 26, 28 each comprise two spaced apart apertures 32. However, a single aperture or more than two apertures can be used.

In some embodiments, it is envisaged that first, second and third arms 24, 26, 28 are hollow or at least partially hollow, to receive the elongate frame members 16, rather than the first, second and third arms 24, 26, 28 being received within the elongate frame members 16. In such embodiments, apertures 32 can be shaped to receive a nut such that a head of the nut is seated within the aperture and does not protrude from the first, second and third arms 24, 26, 28.

Figure 8:
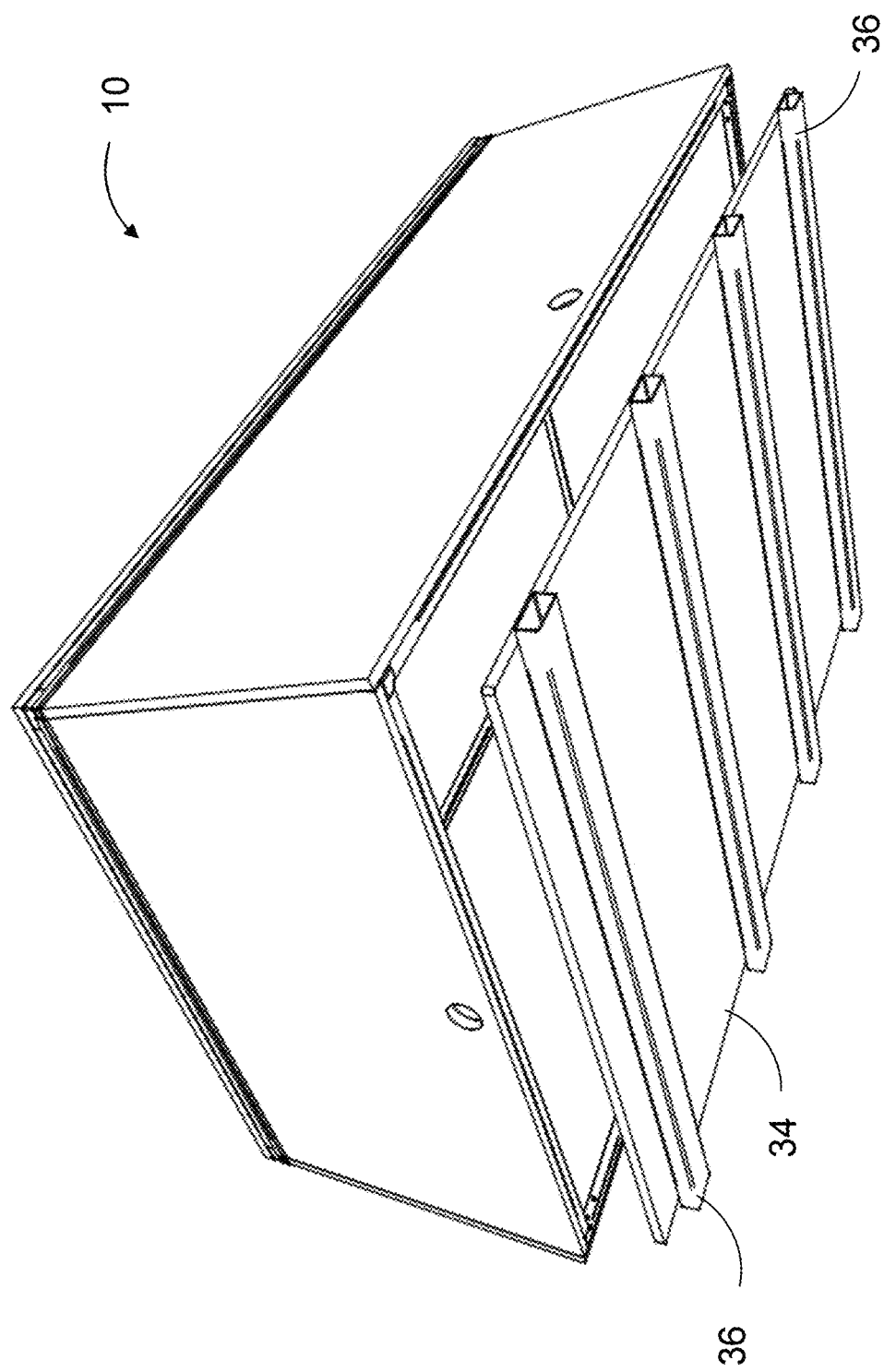
FIG. 8 is an underside perspective view of the canopy of FIG. 1 showing a floor of the canopy.

Referring to FIG. 8, in some embodiments, the utility vehicle canopy 10 further comprises, or is attached to, a floor 34. The floor 34 comprises one or more mounts 36 to mount the floor 34 to a chassis of the utility vehicle. The mounts 36 can be in the form of hollow tubes and affixed to the underside of the floor 34 at intervals, as shown in FIG. 8, by any suitable means such as welding or with fasteners. The floor 34 and the mounts 36 can be made of any suitable material, such as steel. In some embodiments, the utility vehicle canopy 10 can comprise one or more legs for coupling the canopy to the floor 34 or to the chassis of the utility vehicle such that the canopy is removable. For example, corner members 18 can comprise a fourth arm extending in the opposite direction to the third arm 28 and perpendicular or substantially perpendicular to the first and second arms 24, 26. Therefore, in some embodiments the canopy comprises four legs, one in each corner. The fourth arm of each corner member 18 can be received in an aperture in the floor 34 or in apertures in the chassis of the vehicle and secured using any suitable type of quick release latches, such as over centre latches or pin type latches. Alternatively, one or more legs can extend from the underside of the floor 34 for coupling to the chassis in a similar manner as described above.

Figure 9:
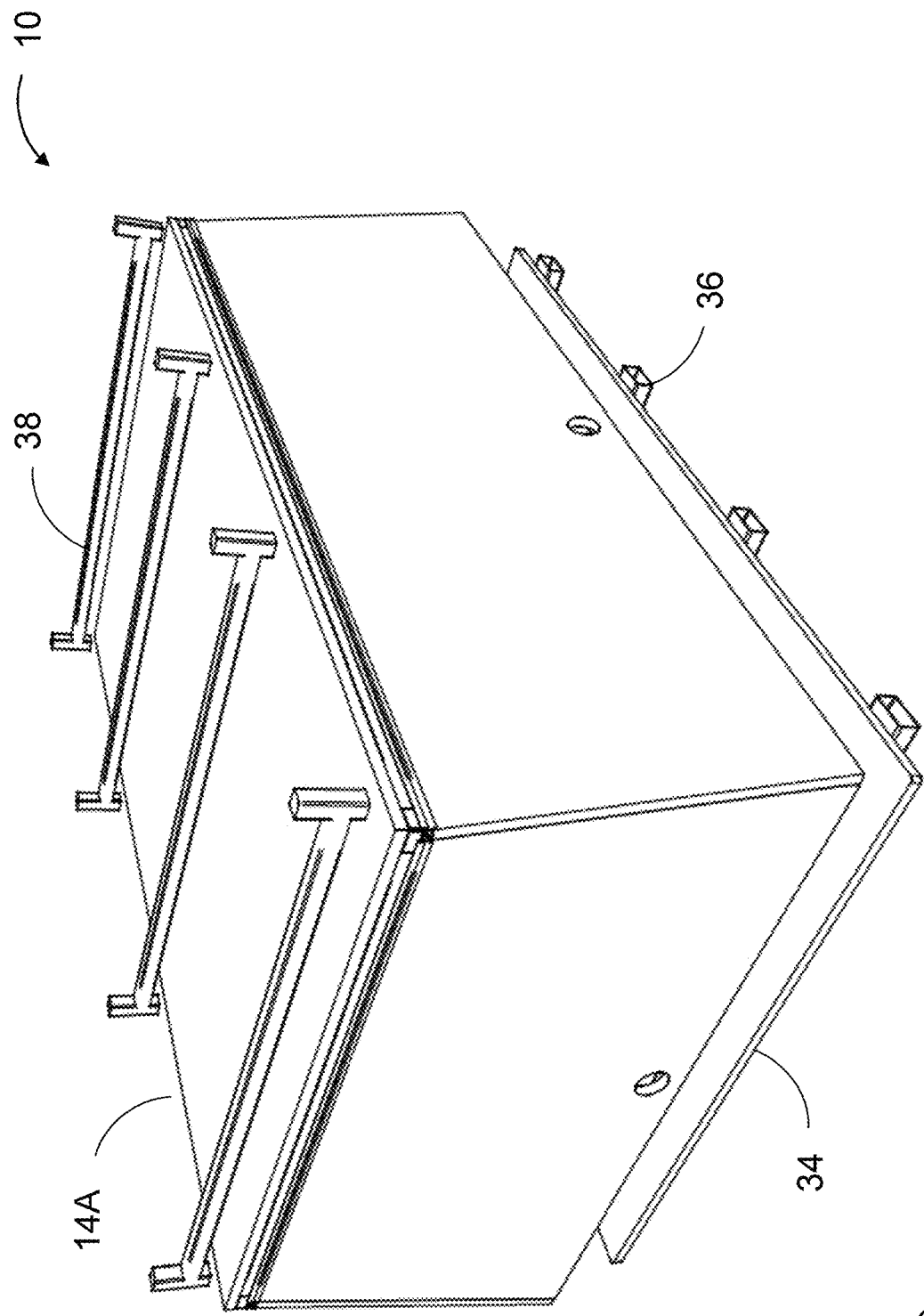
FIG. 9 is a perspective view of the canopy showing a rack of the canopy.

As shown in FIG. 9, the utility vehicle canopy 10 can comprise one or more racks 38 mounted to the roof panel 14A at intervals to provide additional storage capacity. Racks 38 can be made of any suitable material, such as tubular steel or suitable plastics material. In some embodiments, racks 38 can form part of a roll over protection system (ROPS) fitted to the canopy 10 to provide protection, for example in environments where such safety features are required, such as mines and building sites. Alternatively, the ROPS can be provided in addition, or as an alternative to racks 38. The ROPS can be coupled to the canopy 10 and/or a part of the utility vehicle, such as the tray and/or the chassis of the vehicle.

Figure 10:
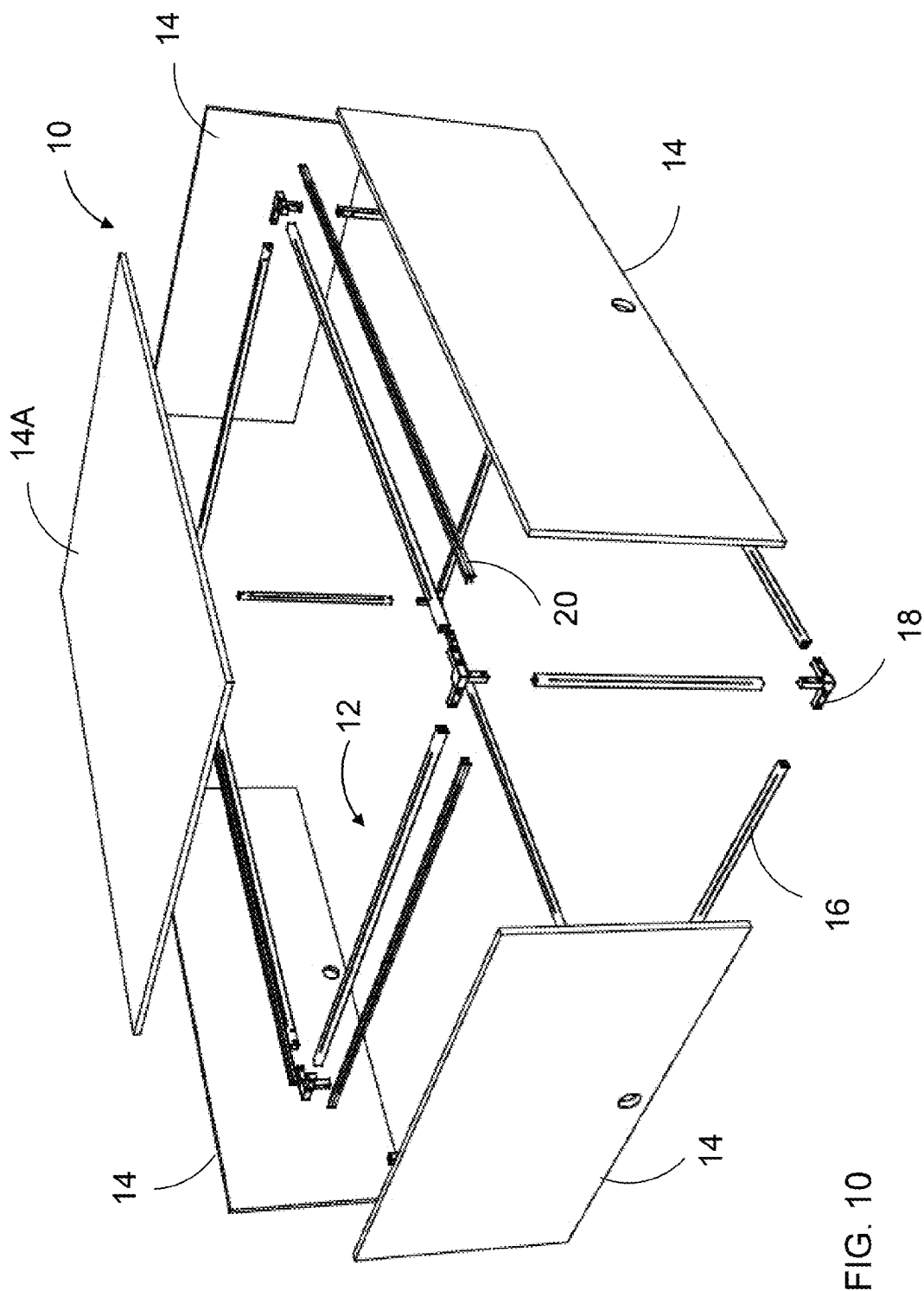
FIG. 10 is an exploded view of a utility vehicle canopy in accordance with another embodiment of the present invention.
Figure 11:
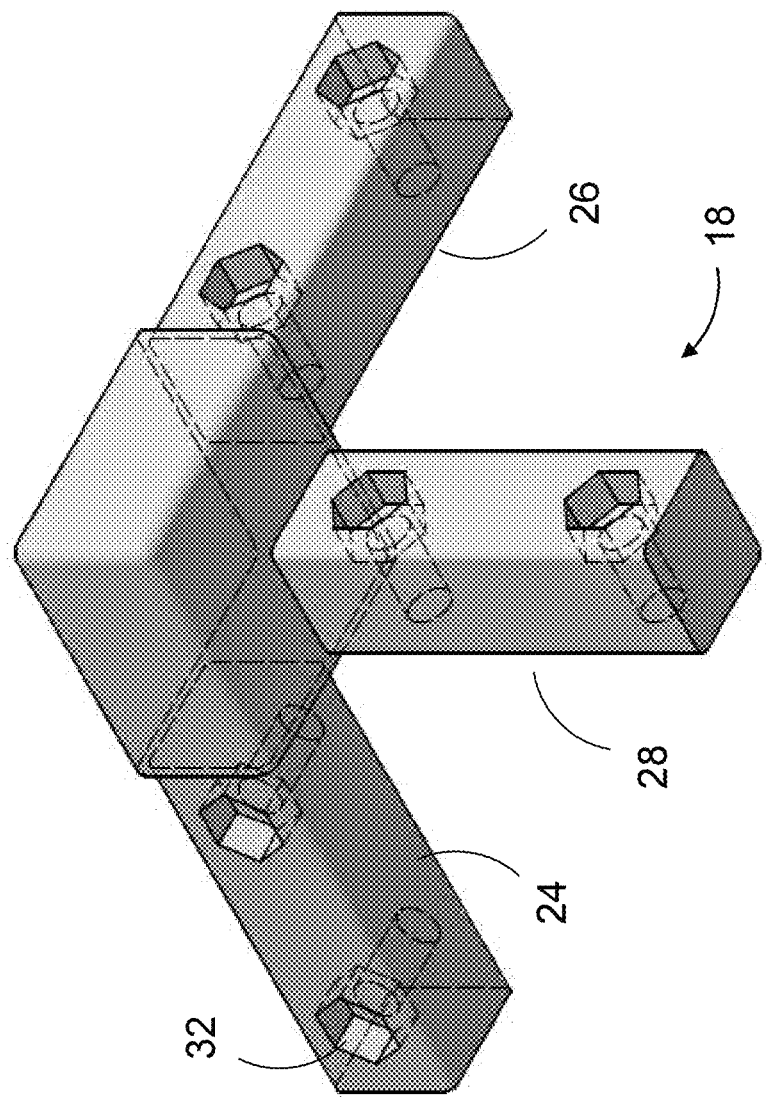
FIG. 11 is an enlarged perspective view of a corner member for the frame of the canopy shown in FIG. 1.
Figure 12:
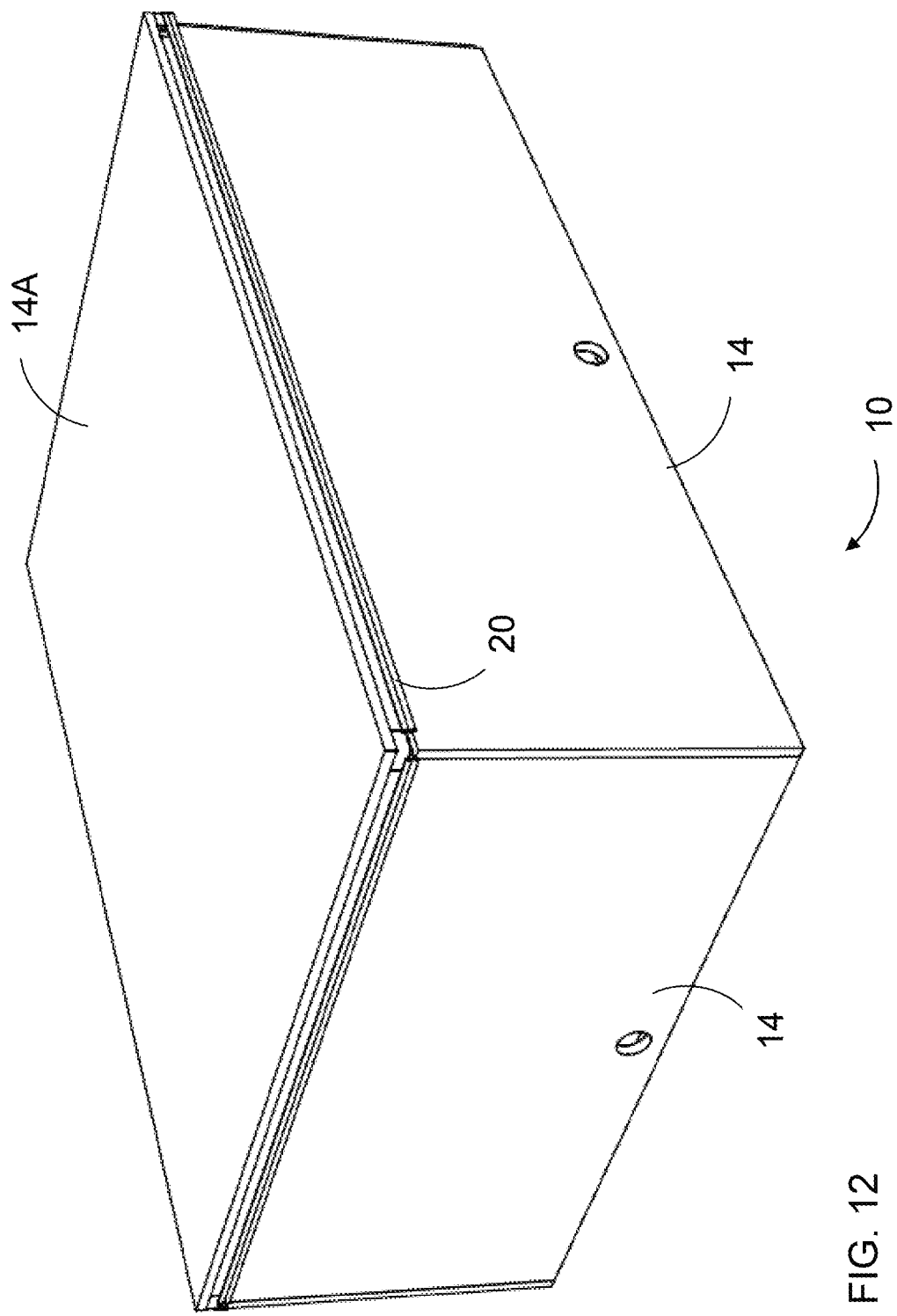
FIG. 12 is a perspective view of the canopy shown in FIG. 10 in an assembled state.

FIG. 10 shows another embodiment of the utility vehicle canopy 10 in which the sides of the canopy are vertical or substantially vertical rather than inclined. The canopy 10 has the same construction as discussed in previous embodiments. Hence, the canopy 10 comprises a frame 12 having a plurality of elongate frame members 16 coupled together with a plurality of corner members 18 and a plurality of panels 14 affixed to the frame 12. However, in these embodiments, the end panels are also quadrilaterals due to the vertical or substantially vertical nature of the sides of the canopy. Also, with reference to FIG. 11, the third arm 28 of the corner members 18 in this embodiment is perpendicular or substantially perpendicular to the first and second arms 24, 26. Therefore, the upper level 12A and the lower level 12B of the frame 12 have the same or substantially the same area resulting in the box-shaped canopy 10 shown in FIG. 12.

It is envisaged that in other embodiments of the present invention, the first and second arms 24, 26 of the corner members 18 need not be perpendicular or substantially perpendicular. For example, an oblique or acute angle may be required between the first and second arms 24, 26 of the corner members 18 to achieve the desired shape of the canopy 10. It is also envisaged that the construction method described herein can be used for canopies for applications other than utility vehicles, such as trailers.

Figure 13:
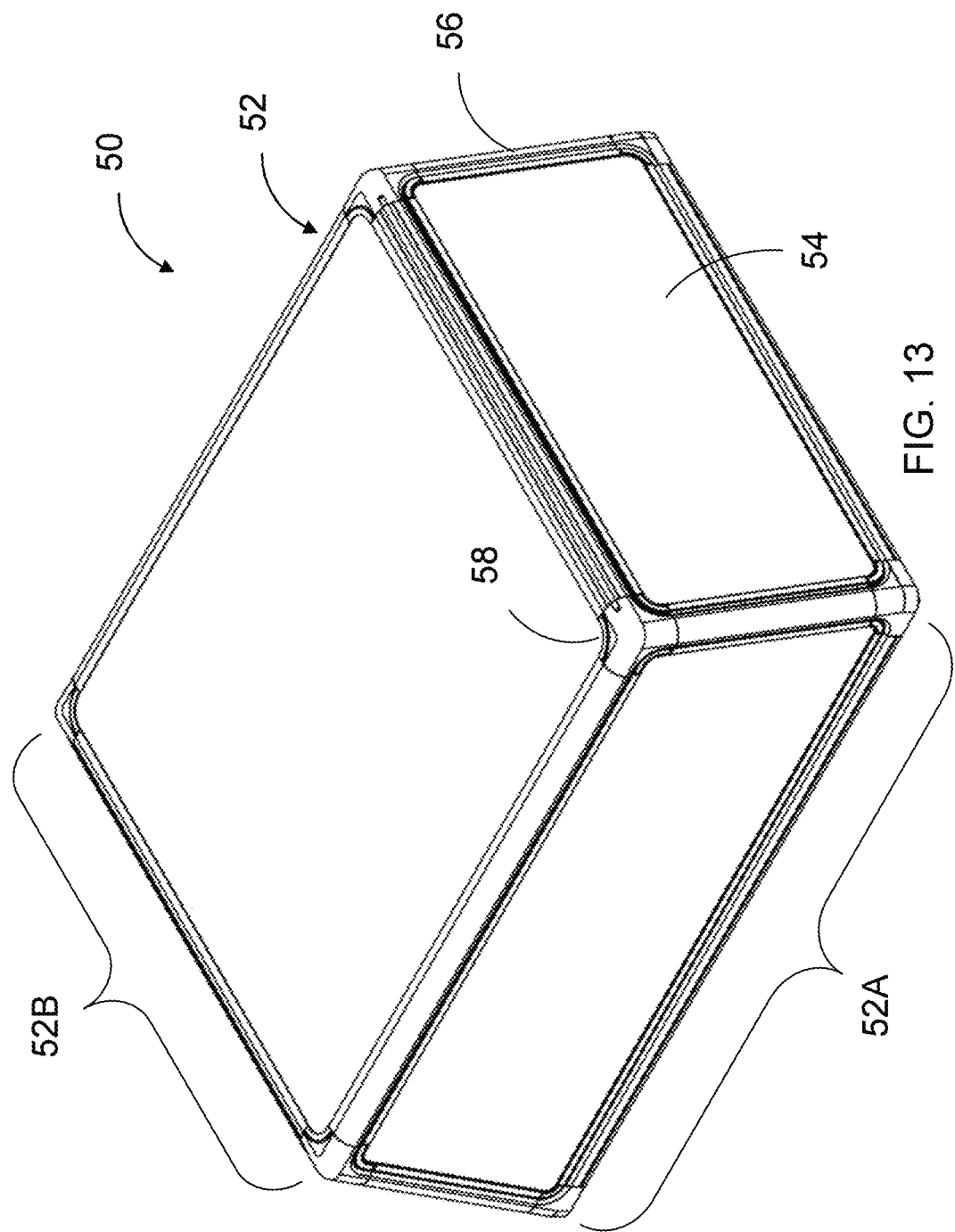
FIG. 13 is a perspective view of a utility vehicle canopy in accordance with another embodiment of the present invention.

FIG. 13 shows a perspective view of another embodiment of the present invention. In this embodiment a utility vehicle canopy 50 comprises a frame 52 and a plurality of panels 54 affixed to the frame. The frame 52 comprises a plurality of elongate frame members 56 coupled together with a plurality of corner members 58. The frame 52 comprises a lower level 52A comprising four elongate frame members 56 coupled together with four corner members 58. The frame 52 also comprises an upper level 52B comprising four elongate frame members 56 coupled together with four corner members 58. The area covered by the lower level 52A of the frame 52 can match the area of a tray (not shown) of the utility vehicle and is larger than the area covered by the upper level 52B of the frame 52. Four elongate frame members 56 couple the corner members 58 of the upper and lower levels of the frame 52 in a spaced apart relationship, thus defining the shape and volume of the canopy 50. The elongate frame members 56, and therefore the frame 52 and the canopy 50, are inclined from the lower level 52A to the upper level 52B.

FIG. 14 shows an exploded perspective view of the embodiment shown in FIG. 13. Accompanying FIGS. 14A-D show zoomed views of the associated regions of FIG. 14. Each panel 54 comprises a panel frame 62 around the edge of the panel 54. The panel frame 62 comprises a plurality of elongate panel frame members 66 coupled together with a plurality of panel corner members 68. The elongate panel frame members 66 and the panel corner members 68 comprise a slot 64 along one side to receive the edge of the panel. The panel corner members 68 comprise a projection 69 at each end to be received by the elongate panel frame members 66 and lock the panel corner members 68 and elongate panel frame members 66 together. In this embodiment, the corners of the panels 54 are rounded and the panel corner members 68 are curved to fit over the rounded corners of the panel 54. The rounded corners of the panel 54 and the panel frame 62 reduce the risk of damage to the edges of the panel 54. In some embodiments, panels 54 are transparent to form windows of the canopy 50. Panels 54 can be made of any suitable material, such as toughened glass or Perspex.

The elongate frame members 56 have an arcuate or arc-shaped cross section. The elongate frame members 56 comprise one or more longitudinal channels therethrough and have one or more flanges 86 along their lateral edges. A profile of the lateral sides of the elongate frame members 56 is complementary with the profile of the elongate panel frame members 66 to enable the elongate panel frame members 66 to nest in or lock into the elongate frame members 56. The elongate frame members 56 can be manufactured via an extrusion process and can be made of aluminium.

The corner members 58 comprise an inner corner member 58A and an outer corner member 58B. The inner corner members 58A comprise a first arm 74, a second arm 76 and a third arm 78 which are received within the elongate frame members 56. The elongate frame members 56 can be secured to the inner corner members 58A via one or more fasteners 82. The outer corner members 58B are fitted over the inner corner members 58A and locked in place to cover the fasteners 82. The corner members 58 can be manufactured via a moulding process.

Figure 15C:
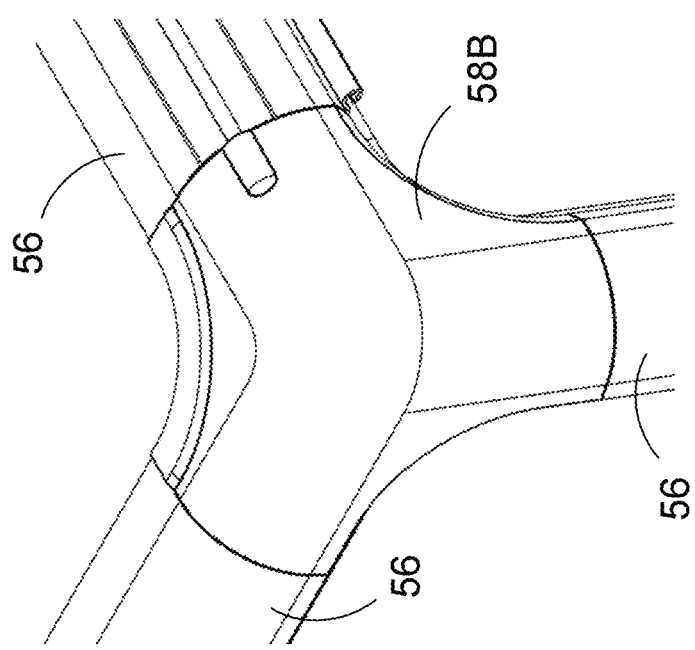
FIG. 15C is a perspective view showing the three elongate frame members and the inner corner member shown in FIG. 15B with an outer corner member fitted over the inner corner member.

FIGS. 15A, 15B and 15C are perspective views showing three elongate frame members 56 and one of the corner members 58 in more detail. As shown in FIG. 15A, an inner profile of the elongate frame members 56 is complimentary to an outer profile of the arms 74, 76, 78 to enable the elongate frame members 56 and the corner member 58 to fit together in a close fitting relationship. The elongate frame members 56 comprise one or more longitudinal tubes 86 to receive the one or more fasteners 82. The arms 74, 76, 78 comprise one or more recesses 80 to accommodate the tubes 86. The elongate frame members 56 can be secured to the inner corner member 58A via the one or more fasters 82 as shown in FIG. 15B.

A slot 94 is provided in an inside edge of one or more of the elongate frame members 56 in the upper level 52B to receive a roof panel 54A.

Referring to FIG. 15C, the outer corner members 58B are fitted over the inner corner members 58A such that the outer corner members 58B have an outer surface flush with an outer surface of the adjacent elongate frame members 56.

Figure 16:
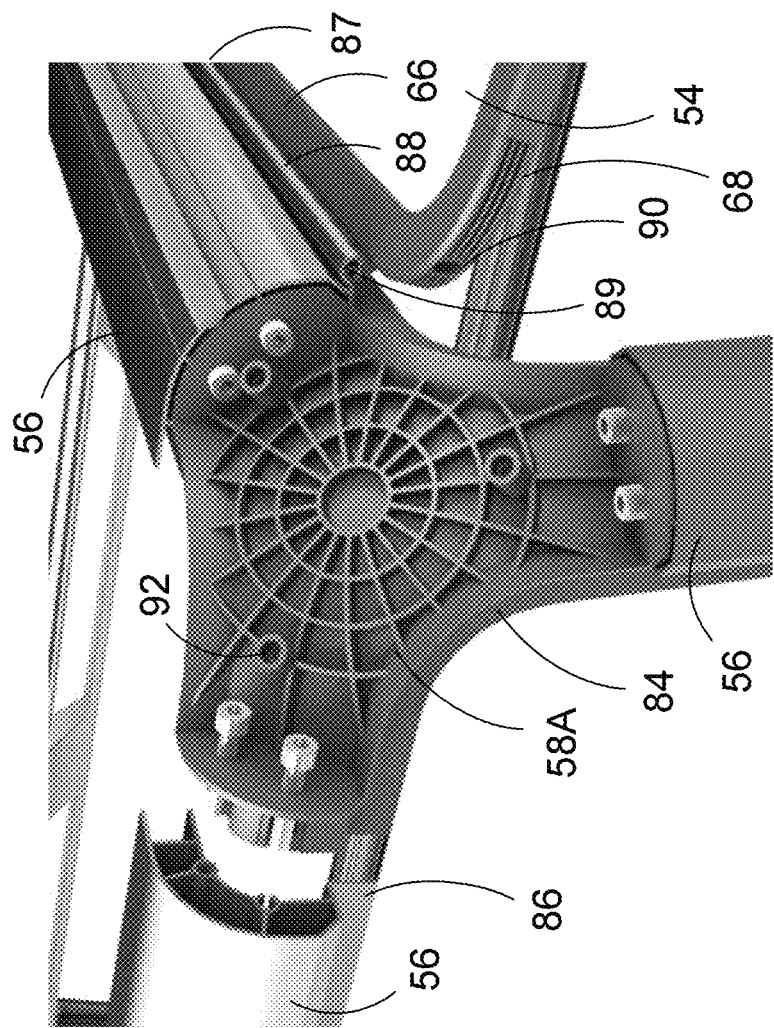
FIG. 16 is a perspective view showing the three elongate frame members and the inner corner member shown in FIGS. 15A and 15B with a panel hinged to the elongate member.

FIG. 16 is a perspective view of three elongate frame members 56 and an inner corner member 58A with a panel 54 hinged to one of the elongate frame members 56 via a hinge 87. In this embodiment, the hinge 87 comprises a first part 88 formed integrally with, or coupled to, the elongate frame member 56 and a second part 89 formed integrally with, or coupled to, the elongate panel frame member 66. The second part 89 is received pivotally within the first part 88. In alternative embodiments, the hinge 87 can have the first part received pivotally within the second part, or be another hinge as described in this specification or known in the art. The panel corner members 68 and/or elongate panel frame members 66 can be secured to the panel 54 via one or more fasteners 90.

The profile of the corner members 58 adjacent the panels 54 is complimentary to the rounded profile of the corresponding corners of the panel corner members 68 and/or panel 54. The outer corner members 58B and/or the inner corner members 58A comprise a web or rim 84 between the arms 74, 76, 78 to provide a recess into which the panel corner members 68 can nest or lock. The rim 84 is designed to sit flush with the flanges 86 of the adjacent elongate frame members 56 when the elongate frame members 56 are coupled to the corner members 58. The inner corner member 58A and/or the outer corner member 58B can comprise one or more clips or fasteners 92 to secure the outer corner member 58B to the inner corner member 58A. In this embodiment, the fastener 92 is a self tapping screw. However, in other embodiments, alternative fasteners or clips known in the art can be used.

Figure 17:
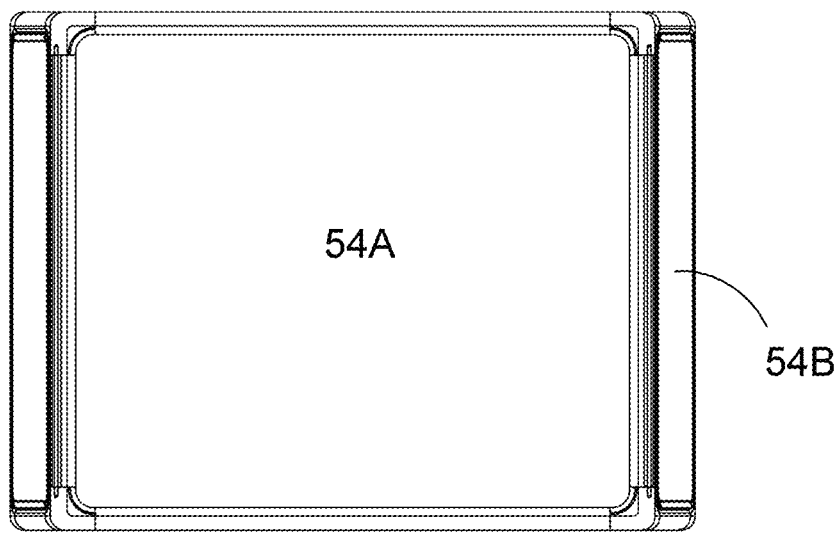
FIG. 17 is a plan view of the utility vehicle canopy shown in FIG. 13.
Figure 18:
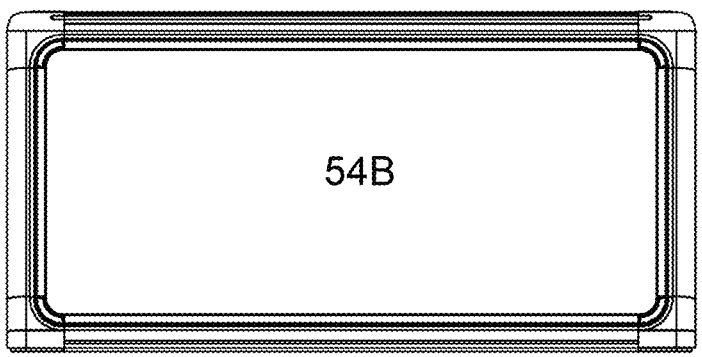
FIG. 18 is a side view of the utility vehicle canopy shown in FIG. 13.
Figure 19:
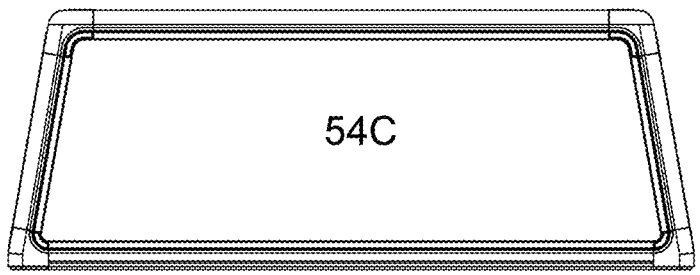
FIG. 19 is a front view of the utility vehicle canopy shown in FIG. 13.

FIGS. 17, 18 and 19 show a plan view, a side view and a front view of the utility vehicle canopy 50, respectively. The canopy 50 comprises four wall panels 54 including two side panels 54B and two end panels 54C, and a roof panel 54A. The side panels and the roof panel are quadrilaterals whereas the end panels are in the shape of a trapezium due to the inclined sides of the frame 52 and the canopy 50.

Figure 20:
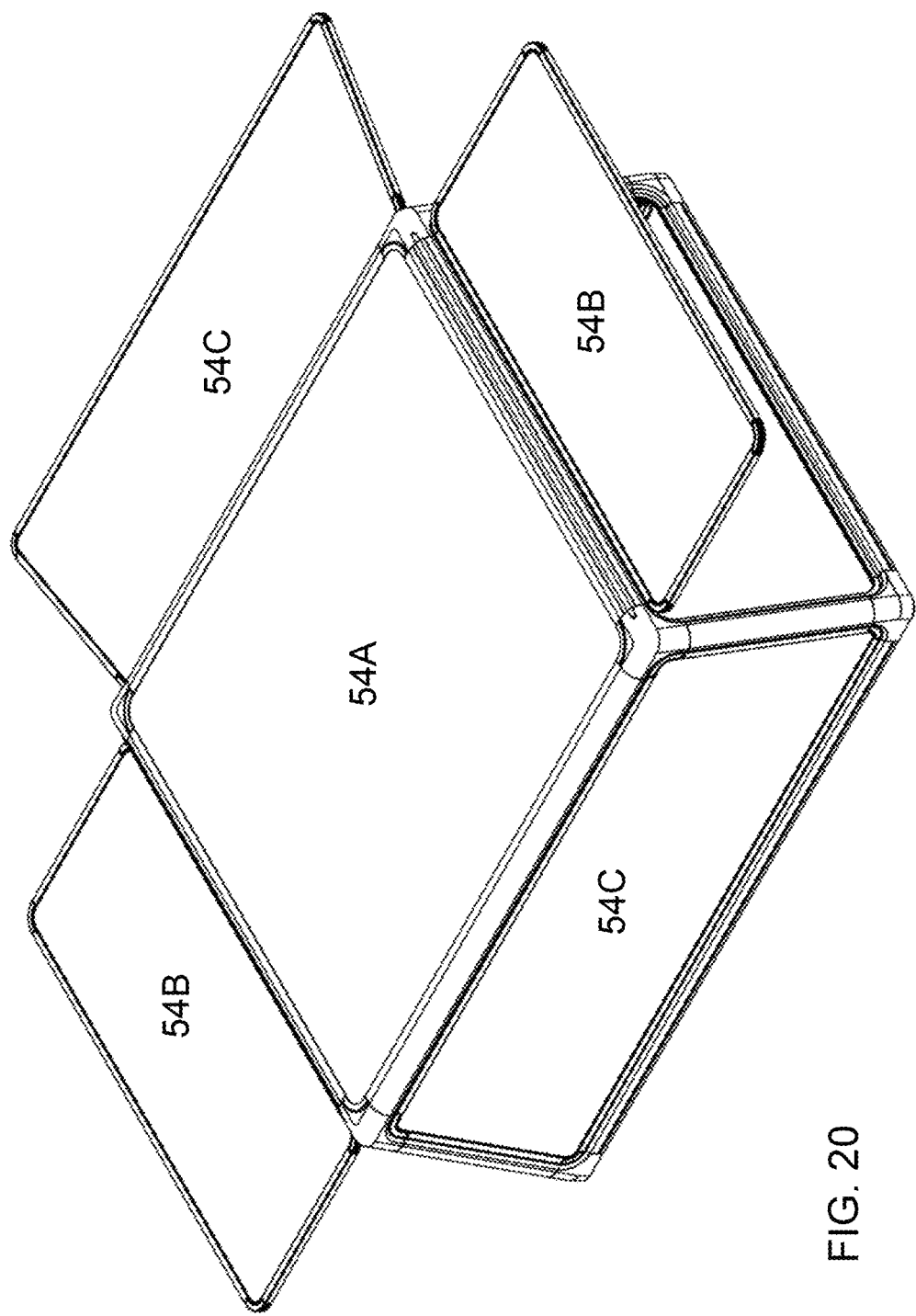
FIG. 20 is a perspective view of the utility vehicle canopy shown in FIG. 13 with the panels opened.

As shown in FIG. 20, one or more of the panels 54 can be affixed to the elongate frame members 56 with a hinge, such as hinge 87, or other pivoting device along one side of the panel. In FIG. 18, the utility vehicle canopy 50 is shown with both side panels 54B and one of the end panels 54C affixed to the elongate frame members 56 with a hinge, which allows access to the interior of the canopy 50 from both sides and the rear of the utility vehicle. The other end panel 54C is not hinged because it would be adjacent the rear of the cabin of the utility vehicle. In some embodiments, the roof panel 54A can be hinged to one of the elongate frame members 56. The hinge can be an integral part of the elongate panel frame members 56 and/or the elongate frame members 56, or a hinge as described herein in relation to other embodiments of the present invention.

Figure 21:
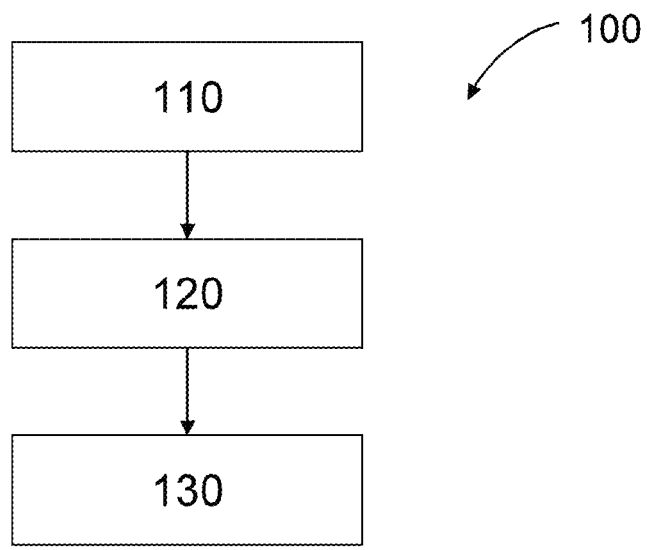
FIG. 21 is a general flow diagram showing a method of constructing a utility vehicle canopy in accordance with embodiments of the present invention.

With reference to FIG. 21 another aspect of the present invention resides in a method of constructing the utility vehicle canopy 10. The method 100 comprises at 110 constructing the frame of the canopy by coupling a plurality of the corner members to a plurality of elongate frame members. In the embodiments described herein, this includes inserting four corner members into four elongate frame members to make each of the lower level and the upper level of the frame. Constructing the frame further includes inserting the third arms of the corner members into four further elongate frame members to couple the lower level and the upper level of the frame. The corner members and the elongate frame members can also be secured together with fasteners. In some embodiments, the corner members comprise outer corner members and inner corner members, and the outer corner members are fitted over the inner corner members. At 120, the method comprises affixing and/or hinging the plurality of panels to the frame. In some embodiments, the method further comprises fitting a panel frame around each panel. At 130, the method can comprise affixing the floor to the lower level of the frame or affixing the lower level of the frame to a tray of the utility vehicle by any suitable means.

Figure 22:
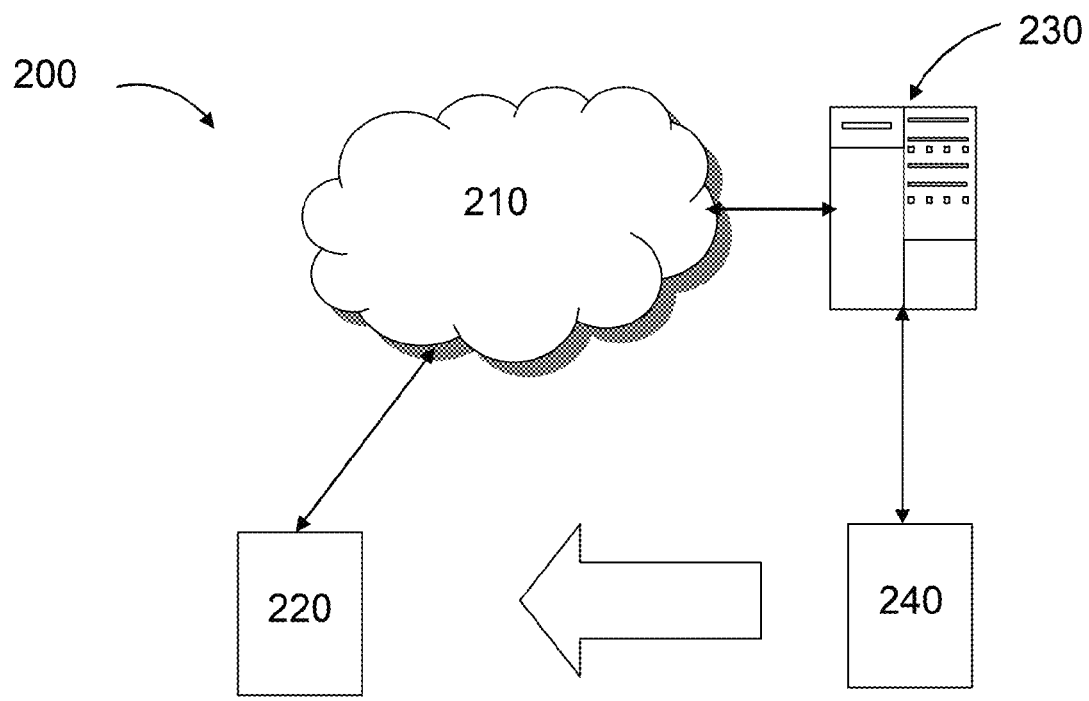
FIG. 22 is a schematic diagram of a system for providing a utility vehicle canopy in accordance with another embodiment of the present invention.
Figure 23:
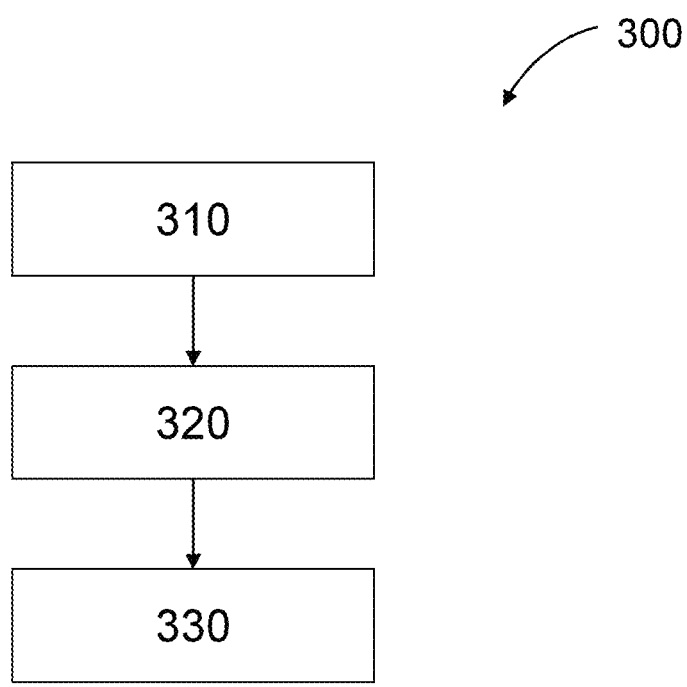
FIG. 23 is a general flow diagram showing a method of providing a utility vehicle canopy in accordance with a further embodiment of the present invention.

With reference to FIGS. 22 and 23, according to other aspects, embodiments of the present invention reside in a method 300 of providing the utility vehicle canopy using system 200. Due to the flat-pack nature of the canopy 10 for transportation purposes, which allows the canopy to be self-assembled, the inventors have devised the method 300 of providing the canopy which involves a communications network 210, such as the internet, as shown in the system 200 in FIG. 22. A user of a utility vehicle who requires a canopy for their vehicle can order the canopy via a user interface, such as a website, displayed on the user's computing device 220, such as a laptop, PC, tablet or smartphone. The user interface is in communication with a computing device 230, such as a server, and the computing device 230 is in communication with a cutting machine 240, such as a computer controlled cutting machine.

With reference to FIG. 23, at 310 the method 300 of providing a utility vehicle canopy comprises computing device 230 receiving over the communications network 210, measurements of the utility vehicle to which the canopy is to be fitted and/or measurements of the canopy required. The measurements can include the length, width and height of the vehicle and/or the canopy and any other preferences for the canopy. Such preferences can include, but are not limited to, whether the canopy should have tapered sides or have vertical sides, positions of windows, locks and/or other fittings, such as handles, or racks on the panels, preferred materials and preferred finishes.

At 320, the method 300 of providing the canopy 10 comprises computing device 220 processing the measurements and cutting a plurality of elongate frame members and a plurality of panels to size with a cutting machine 240 in communication with the computing device 230 based on the measurements.

The method 300 also comprises at 330 providing the plurality of elongate frame members and the plurality of panels cut to size and a plurality of corner members as a kit for self-assembly of the canopy. The corner members are selected according to the shape of canopy required. The compact, flat-pack canopy kit is then shipped to the user for self-assembly and fitting to their vehicle.

According to other embodiments of the present invention, rigid panels 14 of the canopy 10 can be replaced with panels in the form of a flexible, but robust and preferably waterproof material, such as vinyl or canvas. For example, panels can be formed from a plurality of flexible panels coupled together with suitable fasteners, such as zippers or ties, such that the panels can be selectively opened and closed as required. Such flexible panels can be secured to the frame by any suitable fasteners.

The present invention thus addresses or at least ameliorates one or more of the problems of the prior art in that the present invention provides a utility vehicle canopy 10, 50 having a lightweight frame 12, 52 and lightweight panels 14, 54 which are provided as a kit for self-assembly. The canopy 10, 50 can be provided as a flat-pack for easier, cheaper and/or quicker transportation and is easy to assemble without the need for specialised tools or skills. The canopy 10, 50 can be made to order to fit any type of utility vehicle and customers' particular specifications can be accommodated. Therefore vehicle owners are not restricted to the limited range of canopies available for their particular vehicle.

In this specification, the terms "comprises", "comprising" or similar terms are intended to mean a non-exclusive inclusion, such that an apparatus that comprises a list of elements does not include those elements solely, but may well include other elements not listed.

The reference to any prior art in this specification is not, and should not be taken as, an acknowledgement or any form of suggestion that the prior art forms part of the common general knowledge.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A utility vehicle canopy provided as a kit for self-assembly, the kit comprising:
    a plurality of elongate frame members adapted to fit to a utility vehicle;
    a plurality of corner members, each corner member comprising: an inner corner member comprising three arms to receive the elongate frame members to couple the elongate frame members together to form a frame of the canopy; and
    an outer corner member comprising three arms to fit over the inner corner member and flush with an outer surface of the elongate frame members;
    a plurality of panels configured to affix to the frame of the canopy, wherein the canopy comprises:
    a first four of the elongate frame members and a first four of the corner members coupled together to form a lower level of the frame;
    a second four of the elongate frame members and a second four of the corner members coupled together to form an upper level of the frame; and a third four of the elongate frame members inclined from the lower level to the upper level and coupling the corner members of the upper and lower levels of the frame in a spaced apart relationship.

2. The canopy of claim 1, wherein the elongate frame members are hollow tubes.

3. The canopy of claim 1, wherein the elongate frame members have an arcuate cross section.

4. The canopy of claim 1, wherein one or more of the elongate frame members comprise flanges along one or more of their lateral edges.

5. The canopy of claim 1, wherein the corner members comprise an inner corner member over which an outer corner member is fitted.

6. The canopy of claim 5, wherein the outer corner member is secured in place such that an outer surface of the outer corner member is flush with an outer surface of the adjacent elongate frame members.

7. The canopy of claim 1, wherein the arms of the corner members are received within the elongate frame members.

8. The canopy of claim 1, wherein an inner profile of the elongate frame members is complimentary to an outer profile of the arms of the corner members.

9. The canopy of claim 1, wherein the three arms of the corner members comprise a first arm, a second arm and a third arm, and the first and second arms of the corner members are perpendicular or substantially perpendicular and the third arm is inclined with respect to the first and second arms.

10. The canopy of claim 1, wherein at least one of the panels is to the elongate frame members with a hinge.

11. The canopy of claim 10, wherein one or more parts of the hinge are formed integrally with the adjacent elongate frame member or the adjacent panel frame member.

12. The canopy of claim 1, wherein canopy comprises four wall panels and a roof panel.

13. The canopy of claim 1, wherein the canopy further comprises a floor.

14. The canopy of claim 13, wherein the floor comprises one or more mounts to mount the floor to a chassis of the utility vehicle.

15. The canopy of claim 12, wherein the utility vehicle canopy comprises one or more racks mounted to the roof panel.

16. The canopy of claim 1, wherein the elongate frame members are manufactured via an extrusion process.

17. The canopy of claim 1, wherein the corner members are manufactured via a moulding process.

18. A method of constructing a utility vehicle canopy where the canopy is provided as a kit for self-assembly, the kit comprising:
a plurality of elongate frame members adapted to fit to a utility vehicle;
a plurality of corner members, each corner member comprising an inner corner member comprising three arms to receive the elongate frame members to couple the elongate frame members together to form a frame of the canopy and, an outer corner member comprising three arms to fit over the inner corner member and flush with an outer surface of the elongate frame members; and
a plurality of panels cut to size to affix to the frame of the canopy,
the method comprising:
coupling a first four of the elongate frame members and a first four of the corner members together to form a lower level of the frame;
coupling a second four of the elongate frame members and a second four of the corner members together to form an upper level of the frame; and
coupling the corner members of the upper and lower levels of the frame in a spaced apart relationship via a third four of the elongate frame members on an incline from the lower level to the upper level; and
affixing the plurality of panels to the frame.

19. The method of claim 18 including inserting arms of the corner members into the elongate frame members.

* * * * *